United States Patent [19]

Hiner

[11] 4,215,503

[45] Aug. 5, 1980

[54] AUTOMATIC HOOK SETTING APPARATUS

[76] Inventor: Floyd C. Hiner, Rte. 4, Box 105, Fairbury, Nebr.

[21] Appl. No.: 13,739

[22] Filed: Feb. 21, 1979

[51] Int. Cl.³ .............................................. A01K 91/06
[52] U.S. Cl. ........................................................ 43/15
[58] Field of Search ...................................... 43/15, 16

[56] References Cited

U.S. PATENT DOCUMENTS

| 371,777 | 10/1887 | McCabe | 43/15 |
| 2,784,517 | 3/1957 | Mooney | 43/16 |
| 3,001,314 | 9/1961 | Nahrstedt | 43/15 |
| 4,026,058 | 5/1977 | Harris | 43/15 |

Primary Examiner—Nicholas P. Godici
Attorney, Agent, or Firm—Henderson & Sturm

[57] ABSTRACT

This invention relates to automatic hook setting devices in general, and more specifically to a compression spring actuated fishing rod holder which will rapidly rise from a substantially horizontal to a substantially vertical position when a trigger mechanism is tripped. The trigger mechanism is adjustable to vary the force necessary to activate it, and the trigger releasably secures a loop of fishing line so that the hook setting action is not immediate, but occurs only after a predetermined amount of force has been exerted on the line.

10 Claims, 5 Drawing Figures

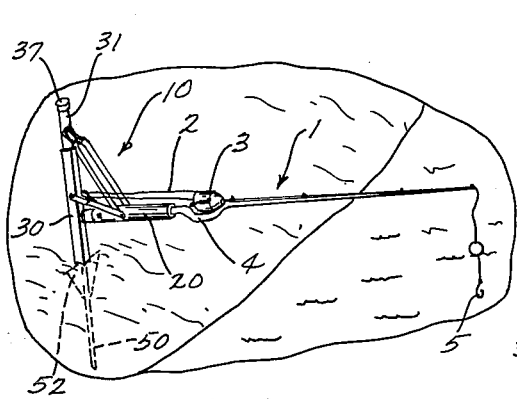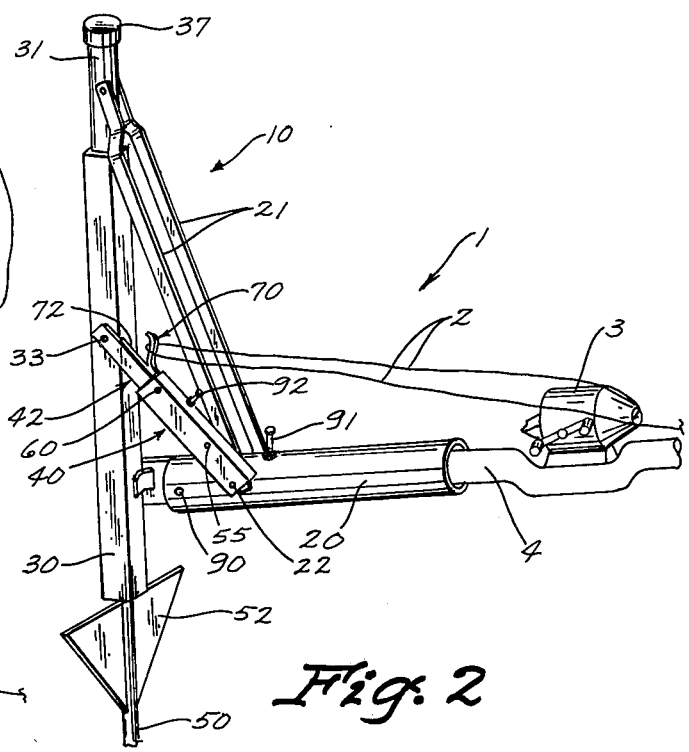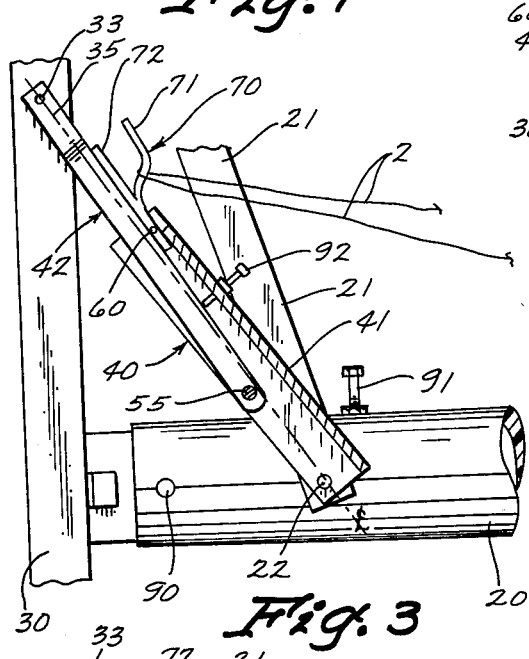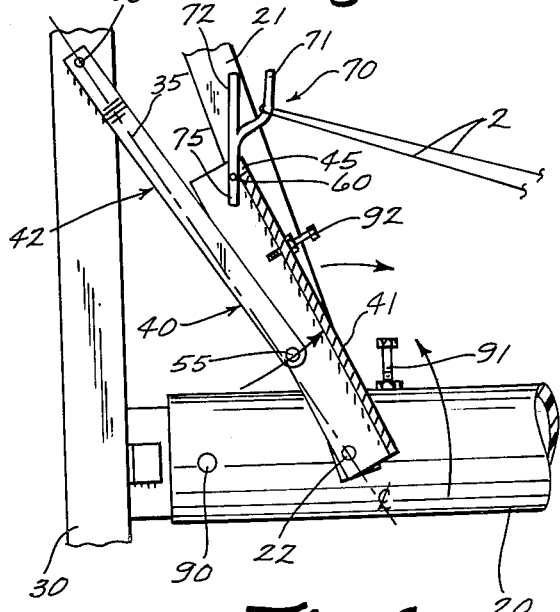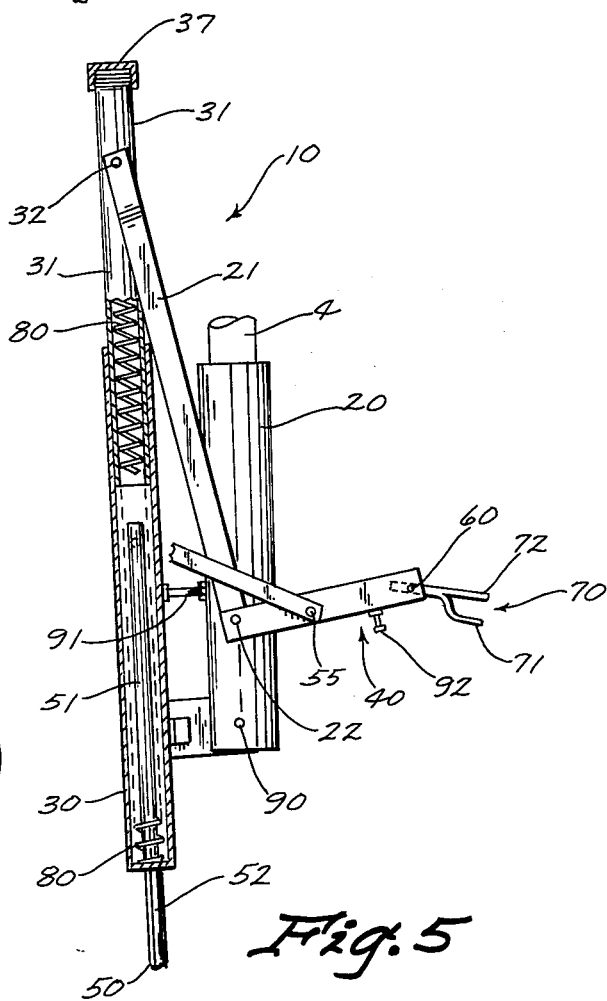

4,215,503

AUTOMATIC HOOK SETTING APPARATUS

BACKGROUND OF THE INVENTION

While some automatic hook setting devices are intended for use on the bank of a river, stream, or pond, the majority of these devices are intended for ice fishing and are of the "tip up" or vertical variety.

There are very few hook setting devices in the prior art which employ a compression spring to impart the force required to set the hook. One example of such a device is U.S. Pat. No. 3,023,531.

The majority of the hook setting devices found in the prior art employ a tension spring released by a trigger mechanism when a downward force is exerted on a line attached to a rod, or reel, or a combination of both. Examples of such devices are illustrated in U.S. Pat. Nos. 4,077,148; 2,944,361; 2,944,360 and 2,564,840.

One characteristic which is shared by virtually every kind of hook setting device, is the immediate transmission of an upward force on the hook, once the trigger mechanism has been tripped. This is a disadvantage because the hook may be immediately pulled from the fishes mouth whereas with the delay mechanism of the instant invention the fish is permitted time to swallow the hook before the hooking force is engaged.

Some of the problems and drawbacks associated with the prior art devices have been: loss of spring tension after repeated usage; inability of the trigger element to be adjusted to vary the force necessary to trip the mechanism; flimsy construction which shortens the useful life of the device; the inability of the device to be utilized for both shore and ice fishing; transmission of the hooking force to the hook at the start of the spring travel at a point when the spring also has to overcome the force of inertia and the drag force of the line through the water resulting in a weaker and less effective hooking force; unrestrained spring travel causing fatigue in the spring coils; the lack of rod handle retaining means to prevent the fishing rod from being thrown from the holder due to centrifugal force; and the absence of enclosure means to protect the spring member from the natural elements and intrusion of harmful foreign objects.

SUMMARY OF THE INVENTION

An object of the invention is the provision of an automatic hook setting device which is actuated by a compression spring and includes an adjustable activating force.

Another object is to provide an automatic hook setting device which is durable, sturdily constructed, and has structural components which prolong the useful life of the compression spring.

A further object of the invention is the provision of an automatic hook setting device which has a delayed reaction between the time the trigger mechanism is tripped and the time the hooking force is transmitted to the hook.

Still another object of this invention is the provision of an automatic hook setting device which utilizes the terminal portion of the spring travel to provide a positive hooking action.

A still further object of this invention is the provision of an automatic hook setting device which employs a spring guide and an enclosure for the spring to protect it from the outdoor elements and the intrusion of harmful foreign objects.

These and other objects, advantages and novel features of the instant invention will become apparent from the detailed description of the invention when considered in conjunction with the accompanying drawings.

BRIEF DESCRIPTION OF THE DRAWINGS

FIG. 1 is a perspective view of the automatic hook setting device of the instant invention in the set position installed on a shoreline.

FIG. 2 is a perspective view of the automatic hook setting device in the set position.

FIG. 3 is a partial cross-sectional side view showing the trigger mechanism in the set or cocked position.

FIG. 4 is a partial cross-sectional side view showing the trigger mechanism immediately after the over-center tripping of the mechanism.

FIG. 5 is a partial cross-sectional side view of the automatic hook setting device in the tripped position.

DESCRIPTION OF THE PREFERRED EMBODIMENT

FIG. 1 shows an automatic hook setting device designated generally as 10 placed on an embankment to suspend a fishing rod 4 in a substantially horizontal position over a body of water.

The fishing rod 1 comprises a fishing line 2 connected at one end to a reel 3 mounted on the rod handle 4 and connected on the other end to a fish hook 5.

The automatic hook setting device 10 comprises a rod holder 20 pivotally connected to two tubular members (30,31) and an over-center trigger mechanism 40. The lower tubular member 30 is supported on a spike element 50 which comprises a rod 51 having a tapered or pointed portion at its lower end (not shown) and an upper end which extends into the interior of the lower tubular member 30 thru a suitable aperture. The spike element 50 is also provided with a flat triangular plate portion 52 which is attached along its vertical centerline in a downward pointing direction to the rod 51 below the tubular member 30 and above the lower pointed end of rod 51. The spike element 50 is rigidly secured to the lower tubular member 30 and is intended to secure member 30 in a substantially vertical position when the rod 50 and triangular plate portion 52 are inserted into soil or ice. The triangular portion 52 of the rod 51 gives the automatic hook setting device 10 lateral stability in the direction of the action and reaction forces which are created once the trigger mechanism 40 has been actuated.

The upper tubular member 31 is mounted telescopically for reciprocal movement with respect to lower tubular member 30, and is connected to the rod holder 20 by a pair of arm elements 21. The arms 21 are pivotally attached to the upper tubular member at 32 and to the rod holder at pivot point 22.

The trigger mechanism 40 is pivotally connected on one end to the rod holder 20 through an aperature in one of the arm elements 21 at pivot point 22 and to the lower tubular member 30 at pivot point 33.

The trigger mechanism 40 comprises a trigger bearing element 41 and a trip lever 42 which are pivotally connected at pivot point 55. The trigger bearing element 41 is pivotally connected at one end to the rod holder 20 through an aperature in one of the arm elements 21 at pivot point 22, and pivotally supports a trigger release lever 70 at its other end. The trigger release lever 70 is pivotally connected to the trigger bearing element 41 at pivot point 60, and comprises a trigger release lever surface 75, a bearing surface 72 and a line retaining projection 71.

Referring now to FIG. 5, it can be seen that the lower tubular member 30 contains a compression spring 80, which encircles the rod 51, and extends throughout the length of the telescopic tubular members 30 and 31. Compression spring 80 biases the upper tubular member away from the lower tubular member to a first position shown in FIG. 5 to a compressed second position corresponding to FIGS. 1-4. The upper tubular member 31 is provided with a threaded cap 37 which forms a bearing surface for the compression spring 80 and also prevents water and dirt from entering the upper tubular member 31 thereby protecting the spring 80.

The operation of the hook setting device is as follows. The rod holder 20 is pivoted about pivot point 90 to the set position shown in FIG. 3. This has the effect of overcoming the compression spring 80 which is subsequently held in place due to the over-center position of pivot point 55 in relation to pivot points 33 and 22. A fishing rod 1 is then inserted into the rod holder 20 and an optional retaining pin element 91 is moved into frictional engagement with the rod handle 4 to prevent the rod from being accidentally withdrawn or flung from the rod holder. A loop of slack line is looped over the line retaining projection 71. The hook setting device is now in its set position.

When a fish bites the baited hook 5, tension is placed on the line which is transmitted to the trigger 70. The tension exerted by the fish rotates the trigger 70 in the clockwise direction. As the trigger 70 is rotated, the bearing surface 72 loses contact with the trip lever 42, and pivot point 55 crosses the line 35 between pivot points 22 and 33. As soon as pivot point 55 passes the centerline 35 between points 22 and 33, the compression spring 80 is released and an upward force is transmitted to the upper tubular member 31. The upward movement of the upper tubular member thru the pivoted linkage assembly (21, 41, 42) causes the rod holder 20 to rapidly pivot from the horizontal position to the vertical position shown in FIG. 5.

The device will operate without the trigger release lever 70 if enough force is applied downwardly on the rod holder 20 to pivot it to the point at which the pivot point 55 crosses the line 35. However, such device operates in a more optimum fashion using line 2 and trigger release lever 70 as disclosed above.

Once the trigger 70 has been tripped, there is momentarily no tension on the line due to the loop of slack line created by disengagement of the line with the line retaining projection 71. The initial upward arc of the rod holder 20 is used to remove the slack portion from the line. Once the slack has been taken up, a sharp upward force is transmitted to the hook thru the line thereby embedding the hook in the fish's mouth. The rod holder 20 continues its arc until the securing/stop element 91 contacts the lower tubular member 30.

The tension required to trip the trigger mechanism may be adjusted by varying the position of the adjustment screw 92 on the trigger bearing element 41. By varying the position of the adjustment screw 92, the pivot point 55 can be moved closer or further from the centerline 35 between the pivots 33 and 22. The nearer pivot point 55 is to the centerline of points 33 and 22, the less force is required to trip the trigger mechanism.

Having thereby disclosed the subject matter of this invention, it should be obvious that many modifications, substitutions and variations of the invention are possible in light of the above teachings. It is therefore to be understood that the invention may be practiced other than as specifically described.

What I claim is:

1. An automatic hook setting device for use in conjunction with a fishing rod having a reel, line and hook connected thereto, wherein the hook setting device comprises:
   an upper tubular member;
   a lower tubular member slidingly receiving said upper tubular member;
   a compression spring biasing said upper tubular member away from said lower tubular member;
   a rod holder pivotally connected to said upper and lower tubular members; and
   a linkage assembly pivotally connecting said rod holder to said upper and lower tubular members; said linkage assembly comprising:
   at least one pivoted arm connected to said rod holder and said upper tubular member, and
   a trigger assembly, which releasably controls the compression spring, pivotally connected to said rod holder and said lower tubular member.

2. An automatic hook setting device as in claim 1; wherein, said trigger assembly comprises:
   a trigger bearing element pivotally connected to said rod holder at a first pivot point,
   a trip lever element pivotally connected to said lower tubular member at a second pivot point,
   wherein trigger bearing and trip lever elements are pivotally connected at a third pivot point.

3. An automatic hook setting device as in claim 2; wherein,
   the third pivot point may be rotated in an arc between the first and second pivot points.

4. An automatic hook setting device as in claim 3; wherein;
   the third pivot point at one segment of its arc overrides the force of the compression spring, and
   the third pivot point at another segment of its arc releases the force of the compression spring.

5. An automatic hook setting device as in claim 2; wherein,
   a loop of line from the reel transmits a force from the hook to the trigger assembly to release the force of the compression spring, and
   the force of the compression spring is transmitted to the hook only after a period of time has elaspsed.

6. An automatic hook setting device as in claim 1 wherein a flanged rod support member is disposed within said lower tubular member for engagement with the ground.

7. An automatic hook setting device for use in conjunction with a fishing rod having a reel, line and hook connected thereto, wherein the hook setting device comprises:
   upper and lower tubular members mounted for relative reciprocation and enclosing a compression spring,
   a trigger mechanism releasably controlling said compression spring,
   a rod holder pivotally connected to said upper and lower tubular members and said trigger mechanism, wherein said trigger mechanism can release said compression spring, to force said upper tubular member vertically away from said lower tubular member, and pivot said rod holder in an upward arc.

8. An automatic hook setting apparatus for use in conjunction with a fishing rod comprising:
a first member;
a second member telescopically disposed with respect to said first member and being moveable between first and second positions with respect to said first member;
means for biasing said second member to said first position;
means for holding a fishing rod pivotally attached to said first member, said rod holding means having first and second positions;
a linkage assembly pivotally attached to said rod holding means and to said second member; and
a trigger assembly means for selectively holding said rod holding means in the second position thereof or releasing said rod holding means for movement to the first position thereof, said trigger assembly means comprising:
a trigger bearing element pivotally connected to said rod holding means at a first pivotal point;
a trip lever element pivotally connected to said first member at a second pivotal point, said trigger bearing element being pivotally connected to said trip lever element at a third pivot point, said third pivotal point being located at one side of an imaginary line connecting said first and second pivotal points when said rod holding means is in said first position and on the other side of said imaginary line when said rod holding means is in said second position thereof, said trigger assembly means holding said rod holding means and said second member in the respective second positions thereof when said third pivotal point is on said one side of said line, and whereby downward pivotal movement of said rod holding means caused by a fish pulling on a fishing pole, causes said thrid pivotal point to move to said other side of said line, thereby releasing the force of said biasing means and allowing said second member and said rod holding means to rapidly move to the respective first positions thereof.

9. An automatic hook setting device as defined in claim 8 wherein said trigger assembly means further comprises a trigger release lever means pivotally attached to said trigger bearing element and contacting said trip lever element when said rod holding means is in the second position thereof for prying portions of said trip lever elements and trigger bearing element apart, thereby moving said third pivotal point from said one side to said other side of said line, said trigger lever means including a projection means thereon for receiving a string from a fishing rod, whereby a fish pulling on the string pivots said trigger release lever means for so moving said third pivotal point across said line, thereby tripping the hook setting device and hooking the fish.

10. An automatic hook setting apparatus as defined in claim 9 wherein said trigger assembly means includes adjustable stop means for adjusting the position of said third pivotal point with respect to said imaginary line when said third pivotal point is on said one side of the imaginary line whereby the force required for tripping the hook setting apparatus can be adjusted.

* * * * *